United States Patent [19]

Pine, Jr. et al.

[11] Patent Number: 4,934,088
[45] Date of Patent: Jun. 19, 1990

[54] METHOD OF HUNTING GAME AND A GAME CALLING DEVICE FOR USE WITH THE METHOD

[75] Inventors: George E. Pine, Jr.; Shannon L. Talkington; Jerry L. Seamans, all of Lake Village, Ark.

[73] Assignee: P.S.T. Manufacturing Company, Inc., Lake Village, Ark.

[21] Appl. No.: 699,549

[22] Filed: Feb. 7, 1985

[51] Int. Cl.$^5$ ............................................. A01M 23/00
[52] U.S. Cl. .......................................................... 43/2
[58] Field of Search ...................... 43/1, 2, 3; 446/184, 446/216

[56] References Cited

U.S. PATENT DOCUMENTS

| | | |
|---|---|---|
| 194,119 | 8/1877 | Arpisella . |
| 1,342,315 | 6/1920 | Ward . |
| 2,106,097 | 1/1938 | Homan ................................ 446/216 |
| 2,388,495 | 11/1945 | Osterholt . |
| 2,515,023 | 7/1950 | Thomson et al. ........................ 43/2 |
| 2,519,324 | 8/1950 | Smith, Jr. . |
| 2,643,483 | 6/1953 | Walker ..................................... 43/2 |
| 2,712,201 | 7/1955 | Wintriss . |
| 3,066,443 | 12/1962 | Mobley . |

Primary Examiner—M. Jordan
Attorney, Agent, or Firm—Fleit, Jacobson, Cohn, Price, Holman & Stern

[57] ABSTRACT

The hunting of game, such as squirrels, is facilitated by the simultaneous steps of simulating a distress cry of a young squirrel and the sounds which would be created by a predator in attacking a young squirrel. The simulated distress cry and sounds of the attacking predator cause inactive mature squirrels to become active and to give an indication of their location, such that they can be hunted effectively during all daylight hours. The distress cry is simulated using a novel game calling device in the form of a whistle and the predator sounds may be simulated by beating the ground with portions of flexible branches of an adjacent bush.

25 Claims, 1 Drawing Sheet

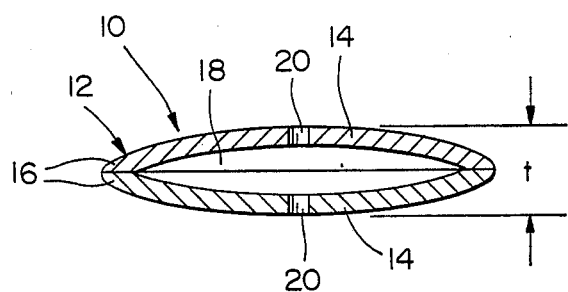
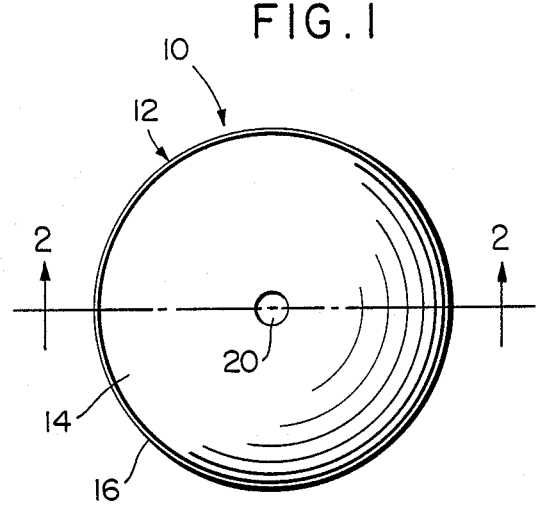
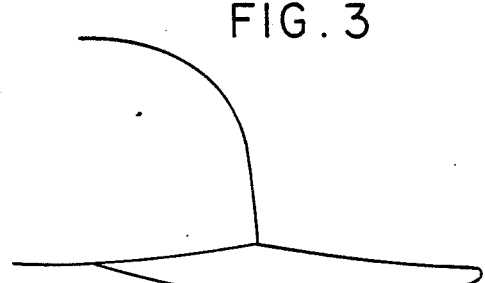
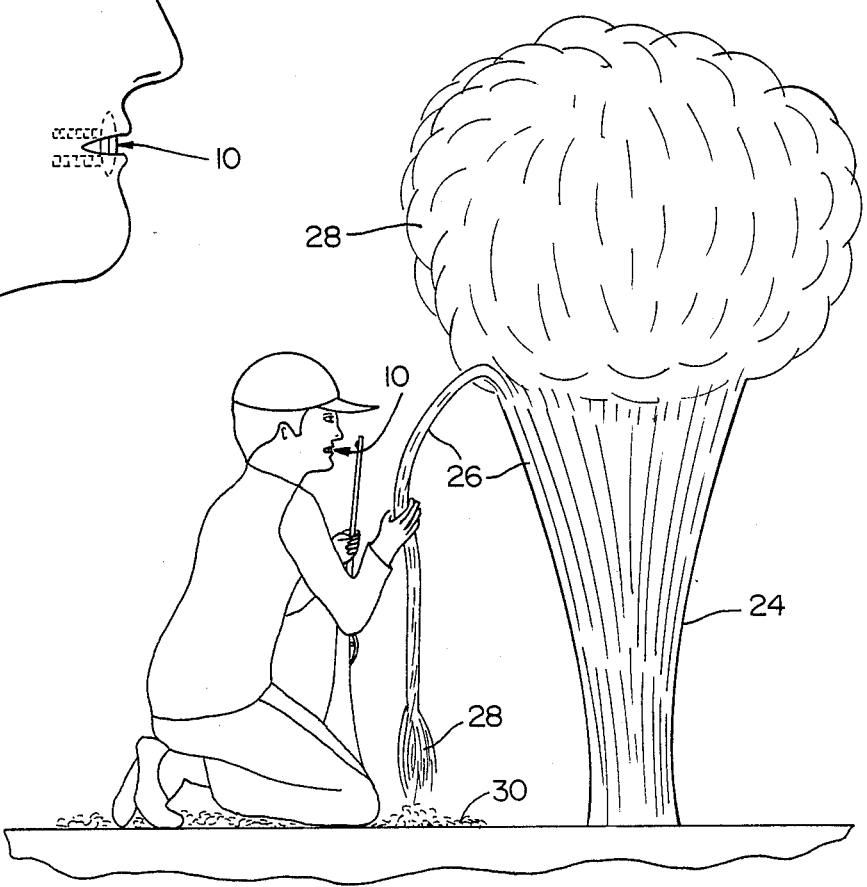

METHOD OF HUNTING GAME AND A GAME CALLING DEVICE FOR USE WITH THE METHOD

BACKGROUND OF THE INVENTION

1. Field of the Invention

This invention relates to a method of hunting game and a game calling device for use with the method, and more specifically to a method of hunting squirrels and a whistle-type device for simulating a distress cry of a young squirrel.

2. Description of the Prior Art

In the hunting of game, it is known that certain animals become inactive during a large portion of the day, making them difficult to hunt effectively by the normal sight and sound method. For example, after mature squirrels have finished feeding in the early morning, such as 30 to 45 minutes after daylight, they tend to become inactive and to settle down in tree holes, or on tree limbs where they blend in with the trees, such that they cannot be seen. Accordingly, a purpose of this invention is to provide a new and improved method and game calling device for hunting squirrels effectively, in which the inactive squirrels are caused to become active so that they can be detected during all daylight hours.

SUMMARY OF THE INVENTION

In general, a method of hunting game in accordance with the invention comprises the step of simulating a distress cry of a young animal of the type being hunted. Simultaneously, sounds which would be created by a predator in attacking a young animal of the type being hunted, are simulated to attract the attention of an inactive mature animal of the type being hunted such that the mature animal becomes active and gives a detectable indication of its location.

More specifically, a method of hunting squirrels in accordance with the invention comprises the step of utilizing a whistle to produce a series of separate signal calls, such as five, having a frequency on the order of 4,300–4,700 cycles per second, to simulate a distress cry of a young squirrel. The first signal call may have a duration of approximately ¾ of a second, the subsequent signal calls may each have a duration of approximately ½ of a second, and the entire series of signal calls may have a duration not exceeding approximately 3½ to 4 seconds. The method further comprises the step, prior to producing the signal calls, of gathering a plurality of flexible branches of an adjacent bush into a cluster and bending the cluster of flexible branches into a position adjacent the ground. Then, as the separate signal calls are produced to simulate the distress cry of the small squirrel, the flexible branches simultaneously are beat against the ground to simulate the sounds of a predator attacking a small squirrel, to attract the attention of an inactive mature squirrel such that the mature squirrel becomes active and gives a detectable indication of its location.

A game calling device in accordance with the invention includes a circular body which includes a pair of opposed inwardly concave circular walls having integrally joined circumferential edges so as to form an essentially closed interior chamber between the walls. The opposed inwardly concave walls of the body are of essentially uniform thickness and have aligned central apertures therethrough which open into the interior chamber. The opposed inwardly concave walls and the apertures therethrough are dimensioned such that a signal call produced by passing air through the aligned apertures, and thus through the interior chamber formed by the walls, simulates a distress cry of a young squirrel. More specifically, the game calling device is in the form of a whistle and is constructed such that the device can be held between the lips and teeth of a user for drawing air through the aligned apertures in the opposed walls, and such that the signal call produced by the air passing through the aligned apertures has a frequency on the order of 4,300–4,700 cycles per second.

BRIEF DESCRIPTION OF THE DRAWINGS

FIG. 1 is a plan view of a game calling device in accordance with the invention;

FIG. 2 is a cross-sectional view taken along the line 2—2 in FIG. 1;

FIG. 3 is a pictorial representation of one manner of using the game calling device of FIGS. 1 and 2 in practicing a method of hunting game in accordance with the invention; and FIG. 4 is a pictorial representation of a hunter practicing the method of hunting game in accordance with the invention.

DETAILED DESCRIPTION

The disclosed embodiment of the invention is directed to a method of hunting game, such as squirrels, in which a hunter simulates a distress cry of a young squirrel utilizing a novel game calling device 10, shown in detail in FIGS. 1 and 2. At the same time, the hunter simulates sounds which would be created by a predator in attacking the young squirrel, as illustrated in FIG. 4. The combined effect of the simulated distress cry of the young squirrel and the simulated sounds of a predator attacking the young squirrel, attracts the attention of an inactive mature squirrel and causes the mature squirrel to become active, such as by barking and/or running up and down a tree limb, to indicate to the hunter the location of the squirrel.

With reference to FIGS. 1 and 2, the game calling device 10 in accordance with the invention is in the form of a whistle consisting of a circular body 12 having a pair of opposed inwardly concave circular walls 14. The walls 14 have integrally joined circumferential edges 16 so as to form an essentially closed interior chamber 18 (FIG. 2) between the walls. The walls 14 also are of essentially uniform thickness and have respective aligned central apertures 20 therethrough which open into the interior chamber 18. The walls 14 and the apertures 20 therethrough are dimensioned such that a signal call produced by passing air through the aligned apertures, and thus through the interior chamber 18 formed by the walls, simulates a distress cry of a young squirrel. In this connection, the construction of the walls 14 and the apertures 20 is such that the signal call produced by sucking or drawing air through the aligned apertures has a frequency of approximately 4,300–4,700 cycles per second.

In use, the game calling device 10 can be held in front of a user's lips with one hand and air then is sucked or drawn through the aligned apertures 20, to produce a signal call as above described. Preferably, however, in order for a hunter's hands to be free while using the game calling device 10, the device is constructed of a size which is small enough to be positioned between the lips and teeth of the hunter as illustrated in FIG. 3, and yet large enough to preclude the possibility of the device being swallowed during use. For example, in a size of the game calling device 10 which permits it to be used in this manner, and in which the device still produces the desired frequency of 4,300-4,700 cycles per second, the circular body 12 of the device had a diameter on the order of 1¼ inches, a thickness "t" (FIG. 2) of the circular body between the outer surfaces of the walls 14 was approximately ⅜ of an inch and the apertures 20 had a diameter of approximately 3/16 of an inch. The game calling device 10 was constructed of thin metal, but it is contemplated that other materials, such as plastic, could be used.

To simulate the distress cry of the young squirrel, the hunter holds the game calling device 10 in front of his lips with one hand, or positions the device between his lips and teeth as shown in FIG. 3. The hunter then sucks air rapidly through the aligned apertures 20 of the device 10 so as to produce a series of separate closely spaced signal calls of short duration in sequence. For example, best results have been achieved utilizing five signal calls, with the first signal call being longer than the subsequent signal calls, as for example ¾ of a second, and the subsequent signal calls being of shorter duration, such as approximately ½ of a second each. Best results have also been achieved when the total time duration of the sequence of signal calls is approximately 3½ to 4 seconds.

As noted above, at the same time the hunter is simulating the distress cry of the young squirrel with the game calling device 10, the hunter is simultaneously simulating the sounds of a predator attacking the young squirrel. In this connection, referring to FIG. 4, prior to using the game calling device 10 to simulate the distress cry of the young squirrel, the hunter locates a bush 24 on the order of six to eight feet tall and having flexible limbs or branches 26 and tender type vegetation 28 which will bend rather than break when struck upon the ground. The hunter then gathers a plurality of the limbs or branches 26 of the bush 24 into a cluster, bends upper portions of the branches over to the ground, and assumes a position on one knee as shown in FIG. 4.

Then, while generating the series of signal calls with the game calling device 10, to simulate the distress cry of the young squirrel as above described, the hunter strikes or beats the vegetation 28 at the upper portions of the cluster of branches 26 against the ground in adjacent leaves 30 to produce rustling type noises in the leaves, and thudding sounds as a result of the branches hitting the ground. More specifically, best results are achieved where the hunter strikes or beats the vegetation 28 of the branches 26 against the ground in conjunction with the generation of the first three signal calls with the game calling device 10, and then discontinues striking of the vegetation against the ground during the generation of the last two signal calls.

When the method of the invention is practiced as above described, it has been found that a mature squirrel which has become temporarily inactive, will be attracted by the simulated distress cry of a young squirrel and the simulated sounds of an attacking predator and will become active for various reasons, to give a readily detectable indication of its location to the hunter. For example, the mature squirrel will immediately come out of a tree hole or a fork of a tree limb on which the squirrel has been laying, and will begin to run up and down an adjacent tree limb chattering and barking loudly, making the squirrel easy for the hunter to locate.

While for best results in practicing the method of the invention the simulating of the sounds of an attacking predator is accomplished utilizing flexible branches 26 and tender vegetation 28 of an adjacent bush 24 as above described, where such a bush is not readily available, a green leafy branch may be broken from an adjacent tree by the hunter and swatted against the ground or the hunter's leg for this purpose. In an extreme situation, where bushes and trees with low branches in the area are limited, the hunter also may simulate the sounds of the attack predator by striking his hand against the ground, an adjacent tree or his leg.

In practicing the method of the invention, when no squirrel in an area responds when the method steps have been performed as described above, after a short time delay, such as 15-20 seconds, the method steps can be repeated. If still no squirrel responds, it generally can be assumed that there are no squirrels in the area within the range (75-125 yards) of the game calling device 10, and the hunter can proceed to a new area.

Further, when a plurality of squirrels in an area respond simultaneously to the performance of the method steps as described above, after one of the squirrels has been shot and retrieved, the method steps can be repeated. In this connection, it has been found that even though the remaining squirrels will again have become silent, when the method steps are repeated they will again become active and indicate their respective locations. In this manner, a plurality of squirrels in the same area can be hunted effectively before moving to a new area.

In summary, a new and improved method of effectively hunting game, such as squirrels, has been disclosed, together with a new and improved game calling device, such as the device 10, for practicing the method. In general, the method combines the step of simulating the distress cry of a young squirrel with the step of simultaneously simulating the sounds of a predator attacking the young squirrel to attract the attention of an inactive mature squirrel such that the mature squirrel becomes active to give a detectable indication of its location. More specifically, the distress cry of the young squirrel is produced utilizing the game calling device 10 to generate a series of separate signal calls, such as five, at a frequency of 4,300-4,700 cycles per second. Preferably, the first generated signal call is of longer duration (e.g. ¾ of a second) than the subsequently generated signal calls, with the entire sequence of signal calls having a total time duration of approximately 3½ to 4 seconds. The sounds of the predator may readily be produced by taking a plurality of branches 26 of an adjacent bush, such as the bush 24, and beating or striking vegetation 28 of the bush against the ground in adjacent leaves 30, in conjunction with the producing of the signal calls utilizing the game calling device 10. Preferably, the sounds of the attacking predator are produced only during the generation of the first three signal calls, with the simulation of the sounds of the attacking predator then being interrupted and discontinued during the generation of the subsequent signal calls.

What is claimed is:
1. A method of hunting game, which comprises the steps of:
   simulating a distress cry of a young animal of the type being hunted; and
   simultaneously simulating sounds which would be created by a predator in attacking a young animal of the type being hunted, to attract the attention of an inactive mature animal of the type being hunted such that the mature animal becomes active and gives a detectable indication of its location.

2. The method of claim 1, wherein the distress cry of the young animal is simulated by producing a signal call having a frequency in a range of approximately 4,300-4,700 cycles per second.

3. The method of hunting game as recited in claim 2, wherein the signal cell having a frequency in the range of approximately 4,300-7,700 cycles per second, is produced by utilizing a whistle.

4. The method of claim 1, wherein the game being hunted is squirrels.

5. The method of claim 3, wherein the distress cry of the young animal is simulated by producing a series of separate signal calls in sequence.

6. The method of claim 5, wherein the sounds of the predator are simulated upon the producing of the first, but not the last, of the signal calls.

7. The method of claim 3, wherein the sounds of the predator are simulated by gathering a plurality of flexible branches of an adjacent bush into a cluster, bending the cluster of flexible branches over to a position adjacent the ground, and beating the ground with portions of the gathered flexible branches.

8. The method of claim 1, wherein the game being hunted is squirrels.

9. The method of claim 1, wherein the distress cry of the young animal is simulated by producing a series of separate signal calls in sequence.

10. The method of claim 9, wherein the first signal call is of longer duration than the subsequent signal calls.

11. The method of claim 10, wherein five signal calls are produced in sequence.

12. The method of claim 11, wherein the first signal call has a duration of ¾ of a second, and the subsequent signal calls each have a duration of approximately ½ of a second, with the entire sequence of signal calls not exceeding 3½ to 4 seconds.

13. The method of claim 11, wherein the sounds of the predator are simulated only upon the producing of each of the first three signal calls.

14. The method of claim 13, wherein the first signal call has a duration of ¾ of a second, and the subsequent signal calls each have a duration of approximately ½ of a second, with the entire sequence of signal calls not exceeding 3½ to 4 seconds.

15. The method of claim 14, wherein the signal calls have a frequencY in a range of approximately 4,300-4,700 cycles per second.

16. The method of claim 1, wherein the sounds of a predator are simulated by gathering a plurality of flexible branches of an adjacent bush into a cluster, bending the cluster of flexible branches over to a position adjacent the ground, and beating the ground with portions of the gathered flexible branches.

17. The method of claim 1, wherein the sounds of a predator are simulated by beating an object with a leafy branch.

18. The method of claim 1, wherein the sounds of the predator are simulated by a hunter striking an object with his hand.

19. The method of hunting game, as recited in claim 1, wherein the distress cry of the young animal is produced by a hunter utilizing a device in the form of a whistle and the sounds of a predator are simultaneously simulated by the hunter utilizing at least one hand to produce the simulated sounds.

20. A method of hunting game as recited in claim 1, wherein at least two separate distress cry signals are produced in sequence and the sounds of the predator are simulated only upon the producing of the first distress signal.

21. A method of hunting squirrels, which comprises:
utilizing a whistle to produce a series of five separate signal calls having a frequency in a range of approximately 4,300-4,700 cycles per second, to simulate a distress cry of a young squirrel, the first signal cell having a duration of approximately ¾ of a second, the subsequent signal calls each having a duration of approximately ½ of a second, and the entire series of signal calls having a duration not exceeding approximately 3½ to 4 seconds;
gathering a plurality of flexible branches of an adjacent bush into a cluster and bending the cluster of flexible branches into a position adjacent the ground prior to producing the series of distress cry-simulating signals with the whistle; and
simultaneously beating the ground with portions of the gathered flexible branches as each of the first three distress cry-simulating signal calls are produced, to attract the attention of an inactive mature squirrel such that the mature squirrel becomes active and gives a detectable indication of its location.

22. A game calling device which comprises:
a circular body which includes a pair of opposed inwardly concave circular walls having integrally joined circumferential edges so as to form an essentially closed interior chamber between the walls;
the opposed inwardly concave walls of the body being of essentially uniform thickness and having aligned central apertures therethrough which open into the interior chamber; and
the opposed inwardly concave walls and the apertures therethrough being dimensioned such that a signal call produced by passing air through the aligned apertures, and thus through the interior chamber formed by the walls, has a frequency in a range of approximately 4,300-4,700 cycles per second, and simulates a distress cry of a young squirrel.

23. The game calling device of claim 16 wherein the thickness of the circular body between outer surfaces of the opposed inwardly concave circular walls and the diameter of the circular walls, are such that the device can be held between the lips and teeth of a user for sucking air through the aligned apertures in the walls, without being easily swallowed.

24. A game calling device which comprises:
a circular body which includes a pair of opposed inwardly concave circular walls having integrally joined circumferential edges so as to form an essentially closed interior chamber between the walls;
the opposed inwardly concave walls of the body being of essentially uniform thickness and having aligned central apertures therethrough which open into the interior chamber; and
the opposed inwardly concave walls and the apertures therethrough being dimensioned such that a signal call produced by passing air through the aligned apertures, and thus through the interior chamber formed by the walls, has a frequency in a range of approximately 4,300-4,700 cycles per second, and simulates a distress cry of a young squirrel;

the thickness of the circular body between outer surfaces of the opposed inwardly concave circular walls, and the diameter of the circular walls, being such that the device can be held between the lips and teeth of a user for sucking air through the aligned apertures in the walls; and the diameter of the circular body being approximately 1¼ inches, the thickness of the circular body between outer surfaces of the opposed inwardly concave circular walls being approximately ⅜ of an inch, and the diameter of the aligned apertures in the walls being approximately 3/16 of an inch.

25. A method of hunting game, which comprises the steps of:

utilizing a whistle to simulate a distress cry of a young animal of the type being hunted by producing a series of five separate signal calls having a frequency in a range of approximately 4,300–4,700 cycles per second, wherein the first signal call has a duration of approximately ¾ second, and the subsequent signal calls each have a duration of approximately ½ second, with the entire sequence of signal calls not exceeding 3½ to 4 seconds; and simultaneously simulating sounds which would be created by a predator in attacking a young animal of the type being hunted, only during the producing of the first three signal calls, to attract the attention of an inactive mature animal of the type being hunted such that the mature animal becomes active and gives a detectable indication of its location.

* * * * *